(12) United States Patent
Yasufuku

(10) Patent No.: US 7,769,954 B2
(45) Date of Patent: Aug. 3, 2010

(54) DATA PROCESSING SYSTEM AND METHOD FOR PROCESSING DATA

(75) Inventor: Kenta Yasufuku, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 615 days.

(21) Appl. No.: 11/693,231

(22) Filed: Mar. 29, 2007

(65) Prior Publication Data

US 2007/0233963 A1 Oct. 4, 2007

(30) Foreign Application Priority Data

Mar. 30, 2006 (JP) ............................. 2006-093636

(51) Int. Cl.
  G06F 12/00 (2006.01)
  G06F 13/00 (2006.01)
  G06F 13/28 (2006.01)
(52) U.S. Cl. .................... 711/137; 711/118; 711/128; 712/207; 713/300
(58) Field of Classification Search ................. 711/128, 711/137, 118; 712/207; 713/300
  See application file for complete search history.

(56) References Cited

U.S. PATENT DOCUMENTS

| | | | |
|---|---|---|---|
| 5,691,920 A * | 11/1997 | Levine et al. ............... | 702/186 |
| 5,778,428 A * | 7/1998 | Batson et al. ............... | 711/128 |
| 6,535,959 B1 * | 3/2003 | Ramprasad et al. ......... | 711/125 |
| 6,643,739 B2 | 11/2003 | Van De Waerdt et al. ... | 711/128 |
| 6,934,811 B2 * | 8/2005 | Cho ........................... | 711/138 |
| 2005/0086435 A1 * | 4/2005 | Todoroki ..................... | 711/128 |
| 2005/0108480 A1 | 5/2005 | Correale, Jr. et al. ........ | 711/128 |

FOREIGN PATENT DOCUMENTS

JP  2004-519776  7/2004

* cited by examiner

*Primary Examiner*—Stephen C Elmore
*Assistant Examiner*—Mark A Giardino, Jr.
(74) *Attorney, Agent, or Firm*—Oblon, Spivak, McClelland, Maier & Neustadt, L.L.P.

(57) ABSTRACT

A data processing system includes: a cache memory comprising a plurality of ways, each of which stores a data line including a data and address information of the data; an analysis module that analyzes whether or not a data requested in a read instruction is to be used in a subsequent instruction to be executed within a predetermined time period after the execution of the read instruction is started; a mode selection module that selects one of a plurality of access modes for accessing the cache memory based on a result of the analysis module; and an access unit that accesses the cache memory in the selected one of the access modes when the read instruction is executed.

18 Claims, 6 Drawing Sheets

FIG. 5

| INSTRUCTION CODE C1 | load   $1 |
|---|---|
| INSTRUCTION CODE C2 | add   $4, $0, $1 |
| INSTRUCTION CODE C3 | sub   $6, $4, $5 |

FIG. 6

| INSTRUCTION CODE C1 | load   $1 |
|---|---|
| INSTRUCTION CODE C2 | add   $4, $0, $3 |
| INSTRUCTION CODE C3 | sub   $6, $4, $5 |

FIG. 8

| CYCLE 1 | EXECUTE READ REQUEST<br>ACCESS CACHE MEMORY AND ACQUIRE ALL INFORMATION IN DATA LINE |
|---|---|
| CYCLE 2 | SELECT OBJECTIVE DATA ACCORDING TO CACHE HIT DETERMINATION |

FIG. 9

| CYCLE 1 | EXECUTE READ REQUEST<br>ACCESS CACHE MEMORY AND ACQUIRE STATUS INFORMATION AND TAG INFORMATION IN DATA LINE |
|---|---|
| CYCLE 2 | DETERMINE WAY TO STORE OBJECTIVE DATA ACCORDING TO CACHE HIT DETERMINATION<br>ACCESS DATA MEMORY OF DETERMINED WAY |
| CYCLE 3 | ACQUIRE OBJECTIVE DATA |

DATA PROCESSING SYSTEM AND METHOD FOR PROCESSING DATA

CROSS-REFERENCE TO RELATED APPLICATIONS

This application is based upon and claims the benefit of priority from the prior Japanese Patent Applications No. 2006-93636, filed on Mar. 30, 2006; the entire contents of which are incorporate herein by reference.

BACKGROUND

1. Field

This invention relates to a data processing system and in particular to a data processing system having cache memory.

2. Related Art

In a data processing system, a frequently accessed data is transferred to a cache memory operating at higher speed than a main memory, whereby the number of times a data processing system accesses the main memory is decreased. Consequently, speeding up data processing of the data processing system is accomplished.

Generally, a part of the address of a data transferred to a cache memory in a main memory becomes the address in the cache memory. Thus, two data stored at different addresses in the main memory may be assigned the same address in the cache memory. In this case, only one of the two data is transferred from the main memory to the cache memory.

An n-way set associative system (where n is an integer of two or more) is adopted as one of systems for associating cache memory and main memory with each other to transfer a plurality of data assigned the same address in the cache memory to the cache memory. In the n-way set associative system, cache memory having n ways is used and a plurality of data assigned the same address in the cache memory are transferred to different ways. As a result, the possibility that a frequently accessed data will not be stored in the cache memory is decreased.

The n-way set associative system adopts a high-speed access mode for giving a high priority to high-speed operation or a low-power access mode for giving a high priority to power saving as a cache memory access mode. In the high-speed access mode, a data requested by a read instruction (which will be hereinafter referred to as "objective data") is selected from among a plurality of data read from all ways. Thus, the objective data is acquired by accessing the cache memory once. However, in the high-speed access mode, a data is read from all ways and thus the power consumption of the data processing system is large.

In the low-power access mode, which way the objective data exists in is determined and then the determined way is accessed for reading data therefrom. To acquire the objective data, the low-power access mode needs to access the cache memory twice. Therefore, a larger number of clock cycles required for acquiring data are necessary for the low-power access mode as compared with the high-speed access mode. However, since a data is read only from the determined way, the low-power access mode enables the data processing system to less consume power as compared with the high-speed access mode.

JP-T-2004-519776 discloses a method of predicting which way the objective data is stored in and decreasing the number of ways from which the data is read, in order to accomplish the high-speed operation and low power consumption of a data processing system. However, in this method, when the prediction fails, the number of clock cycles and power consumption of the data processing system until the objective data is obtained increase.

A data processing system having a pipeline structure processes a data at high speed by concurrently executing a plurality of processes. Therefore, when a data read instruction and an instruction using the read data are executed successively, the read data is used in the processes executed concurrently and therefore it is desirable that the data processing system should adopt the high-speed access mode. However, when the read data is not used in the processes executed concurrently, the processing time of the data processing system in the low-power access mode is the same as that in the high-speed access mode. Therefore, the data read in a read instruction is not used in the instruction executed after the read instruction, it is desirable that the data processing system should adopt the low-power access mode.

As described above, when the data read in a data read instruction is not used in the instruction executed right after the read instruction, a problem of unnecessarily large power consumption occurs in the data processing system adopting the high-speed access mode. On the other hand, in the data processing system adopting the low-power access mode, when a data read instruction and an instruction using the read data are executed successively, the number of clock cycles required for data processing becomes larger than that in the high-speed access mode.

SUMMARY

An aspect of the invention provides a data processing system that makes it possible to select an access mode to cache memory at the execution time of a read instruction in response to the type of instruction to be executed after the read instruction.

An aspect of the invention provides a data processing system including: a cache memory comprising a plurality of ways, each of which stores a data line including a data and address information of the data; an analysis module that analyzes whether or not a data requested in a read instruction is to be used in a subsequent instruction to be executed within a predetermined time period after the execution of the read instruction is started; a mode selection module that selects one of a plurality of access modes for accessing the cache memory based on a result of the analysis module; and an access unit that accesses the cache memory in the selected one of the access modes when the read instruction is executed.

BRIEF DESCRIPTION OF THE DRAWINGS

In the accompanying drawings:

FIG. 5 is a drawing to show an example of operation codes to describe the operation of the data processing system according to the embodiment;

FIG. 6 is a drawing to show another example of operation codes to describe the operation of the data processing system according to the embodiment;

FIG. 8 is a drawing to show an example of clock cycles to describe an access mode according to the embodiment; and FIG. 9 is a drawing to show an example of clock cycles to describe another access mode according to the embodiment.

DETAILED DESCRIPTION

Figure 1:
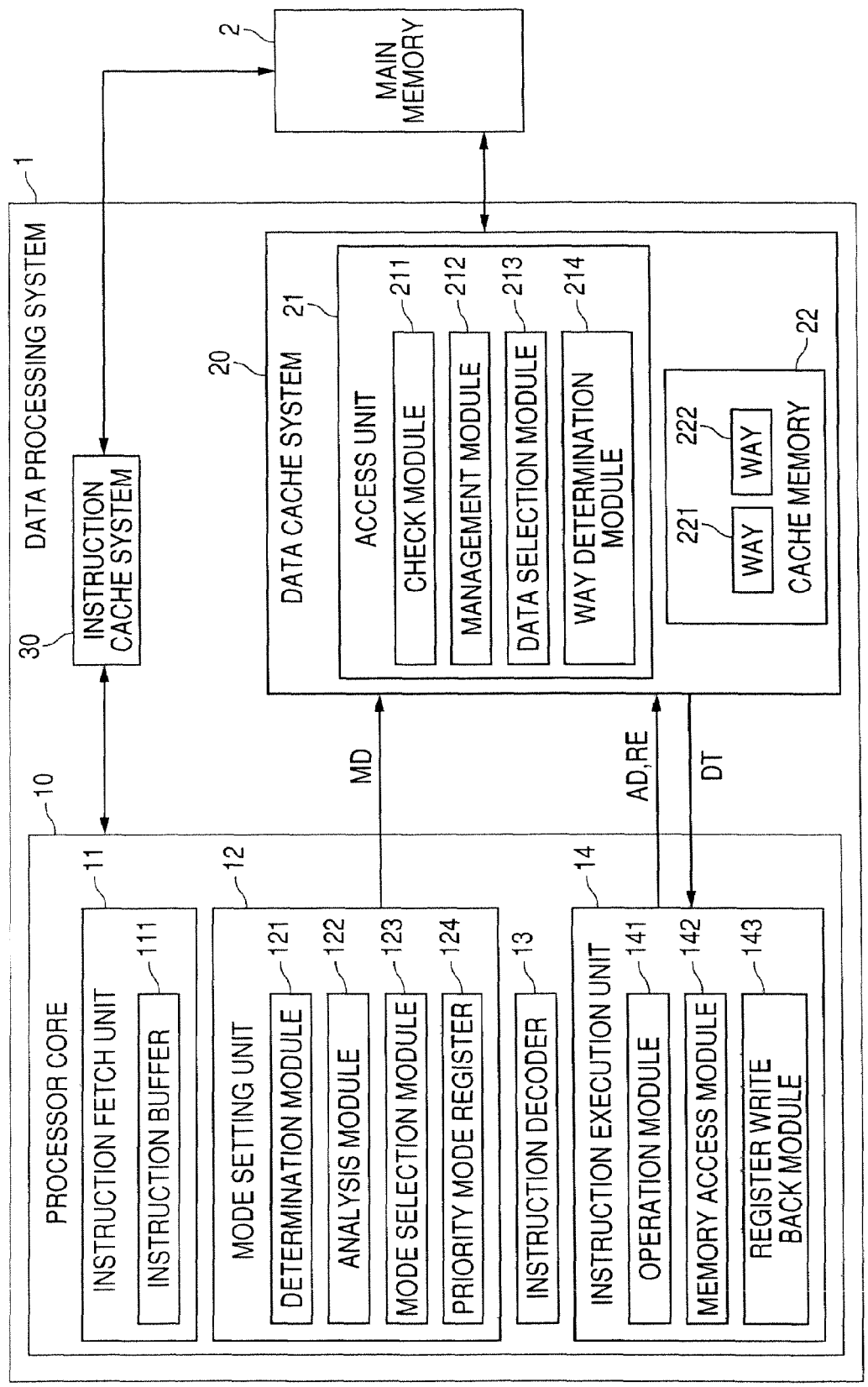
FIG. 1 is a block diagram to show the configuration of a data processing system according to an embodiment of the invention.

An embodiment of the invention will be described with reference to the accompanying drawings. The identical parts or similar parts described below with reference to the accompanying drawings are denoted by the same or similar reference numerals. The following embodiment illustrates an apparatus and a method for embodying the technical idea of the invention and the technical idea of the invention does not limit the structures, placement, etc., of components to those described below. Various changes can be added to the technical idea of the invention.

A data processing system 1 according to the embodiment of the invention includes a cache memory 22 having ways 221 and 222 that stores data lines contains a data and address information of the data, an analysis module 122 that analyzes whether or not a data requested in a read instruction will be used in a subsequent instruction within a predetermined time period after execution of the read instruction, a mode selection module 123 that selects one access mode from among plural access modes different in the number of clock cycles required for reading a data from the cache memory 22 and power consumption taken for reading a data based on the result of the analysis module, and an access unit 21 that accesses the cache memory 22 in the selected access mode at the execution time of the read instruction, as shown in FIG. 1.

The case where the execution result of a read instruction (the data read by the read instruction) will be used in a subsequent instruction to be executed within a predetermined time period after the execution of the read instruction is started will be hereinafter represented as that "subsequent instruction depends (dependent) on the read instruction." How many instructions scheduled to be executed within what time period after the execution of the read instruction is started are adopted as subsequent instructions to be analyzed as to whether or not the instruction depends on the read instruction, depends on the data processing capability of the data processing system 1. In the embodiment, an example will be discussed wherein the data processing system 1 has a five-stage pipeline including stages of instruction fetch, instruction decode, operation, memory access, and register write back. And, two instructions following the read instruction are assumed as subsequent instructions.

As shown in FIG. 1, the data processing system 1 includes a processor core 10, a data cache system 20, and an instruction cache system 30. The processor core 10 includes an instruction fetch unit 11, a mode setting unit 12, an instruction decoder 13, and an instruction execution unit 14. The instruction fetch unit 11 includes an instruction buffer 111. The analysis module 122 and the mode selection module 123 are included in the mode setting unit 12. The mode setting unit 12 further includes a determination module 121 and a priority mode register 124. The mode setting unit 12 transfers a mode signal MD to the data cache system 20 shown in FIG. 1 based on the analysis result as to whether or not any subsequent instruction depends on the read instruction. The operation of the mode setting unit 12 is described later in detail. The instruction execution unit 14 includes an operation module 141, a memory access module 142, and a register write back module 143.

The instruction fetch unit 11 fetches an instruction code from the instruction cache system 30. When the instruction code requested by the instruction fetch unit 11 is not stored in the instruction cache system 30, the instruction cache system 30 reads instruction code from the main memory 2 shown in FIG. 1. The instruction cache system 30 stores the instruction code in cache memory included in the instruction cache system 30 and provides the instruction code to the instruction fetch unit 11. The operation of the instruction cache system 30 such as the operation performed for storing the instruction code in cache memory of the instruction cache system 30, selection of a way to be written, the operation performed when a different instruction code is stored in the storage address of the cache memory, or update of cache management information is the same as the operation of a general instruction cache system.

The fetched instruction code is stored in the instruction buffer 111. The instruction decoder 13 decodes the fetched instruction code. The instruction execution unit 14 executes the decoded instruction. When the decoded instruction is a read instruction, the operation module 141 calculates the access address and the memory access module 142 accesses the data cache system 20.

When a request signal RE and an address signal AD corresponding to an objective data DT are transferred from the instruction execution unit 14 to the data cache system 20, the data cache system 20 transfers the objective data DT to the instruction execution unit 14 when the objective data DT is stored in the cache memory 22. When the objective data DT is not stored in the cache memory 22, the instruction execution unit 14 reads the objective data DT from the main memory 2. The register write back module 143 stores the objective data DT transferred from the main memory 2 in a register included in the processor core 10.

The data cache system 20 includes the access unit 21 and the cache memory 22. The access unit 21 includes a check module 211, a management module 212, a data selection module 213, and a way determination module 214. When a request signal RE is transferred from the instruction execution unit 14, the access unit 21 accesses the cache memory 22 in the access mode indicated by a mode signal MD. The cache memory 22 has the two ways 221 and 222 as shown in FIG. 1. This means that the data processing system 1 adopts a two-way set associative system using two ways. The operation of the data cache system 20 is described later in detail.

Figure 2:
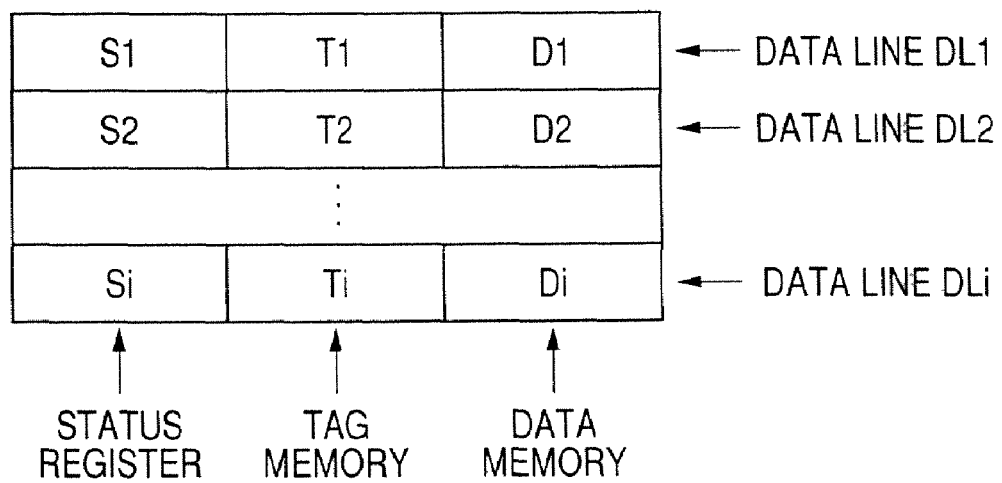
FIG. 2 is a schematic drawing to show the configuration of a way according to the embodiment.

The ways 221 and 222 store a data as data lines containing a status register, a tag memory, and a data memory. FIG. 2 shows a configuration example of the way 221, 222. Each of the ways shown in FIG. 2 stores a data line DLi containing status information Si stored in the status register, tag information Ti stored in the tag memory, and a data Di stored in the memory (i: natural number).

The "data memory" stores a data transferred from the main memory. FIG. 2 shows an example of storing one data in each data memory, but one data memory may store two or more data.

The "status register" stores information regarding the state of the data line stored in the cache memory 22. For example, the status register stores a signal indicating whether or not the data contained in the data line is valid data (validity signal), a signal indicating whether or not the data contained in the data line is overwritten, etc.

The "tag memory" stores the address information of the transferred data in the main memory (which will be hereinafter referred to as "original address"). Generally, the tag memory stores the high-order bits of the original address. The data transferred from the main memory is stored in the address of the cache memory matching the low-order bits of the original address. For example, when the address of the main memory is 32 bits, the high-order 20 bits of the original address are stored in the tag memory and the transferred data is stored in the address of the cache memory matching the low-order 12 bits of the original address. When the address of the main memory specified in the read instruction matches the combination of the information stored in the tag memory and the address of the cache memory, the data is read from the cache memory. The fact that the objective data is stored in the accessed cache memory is referred to as "cache hit."

Figure 3:
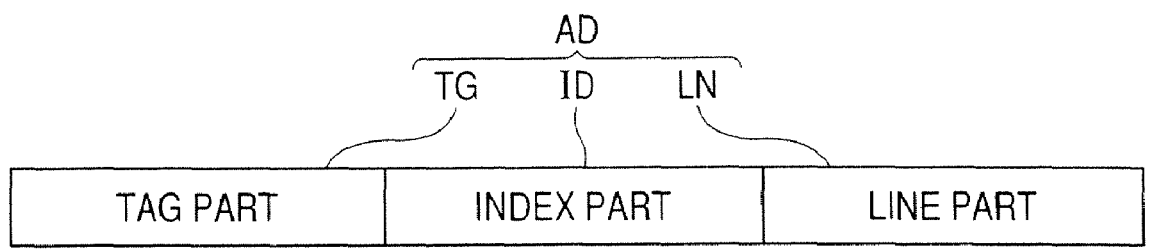
FIG. 3 is a schematic drawing to show the format of an address signal according to the embodiment.

FIG. 3 shows an example of the address signal AD. The address signal AD shown in FIG. 3 contains a tag part TG, an index part ID, and a line part LN. The tag part TG contains information corresponding to the tag information stored in the tag memory of the way 221, 222. The index part ID specifies the address of the cache memory 22. The line part LN specifies the location of the data memory in a data line. When two or more data are stored in one data memory, the line part LN specifies the location of the objective data in the data line.

Figure 4:
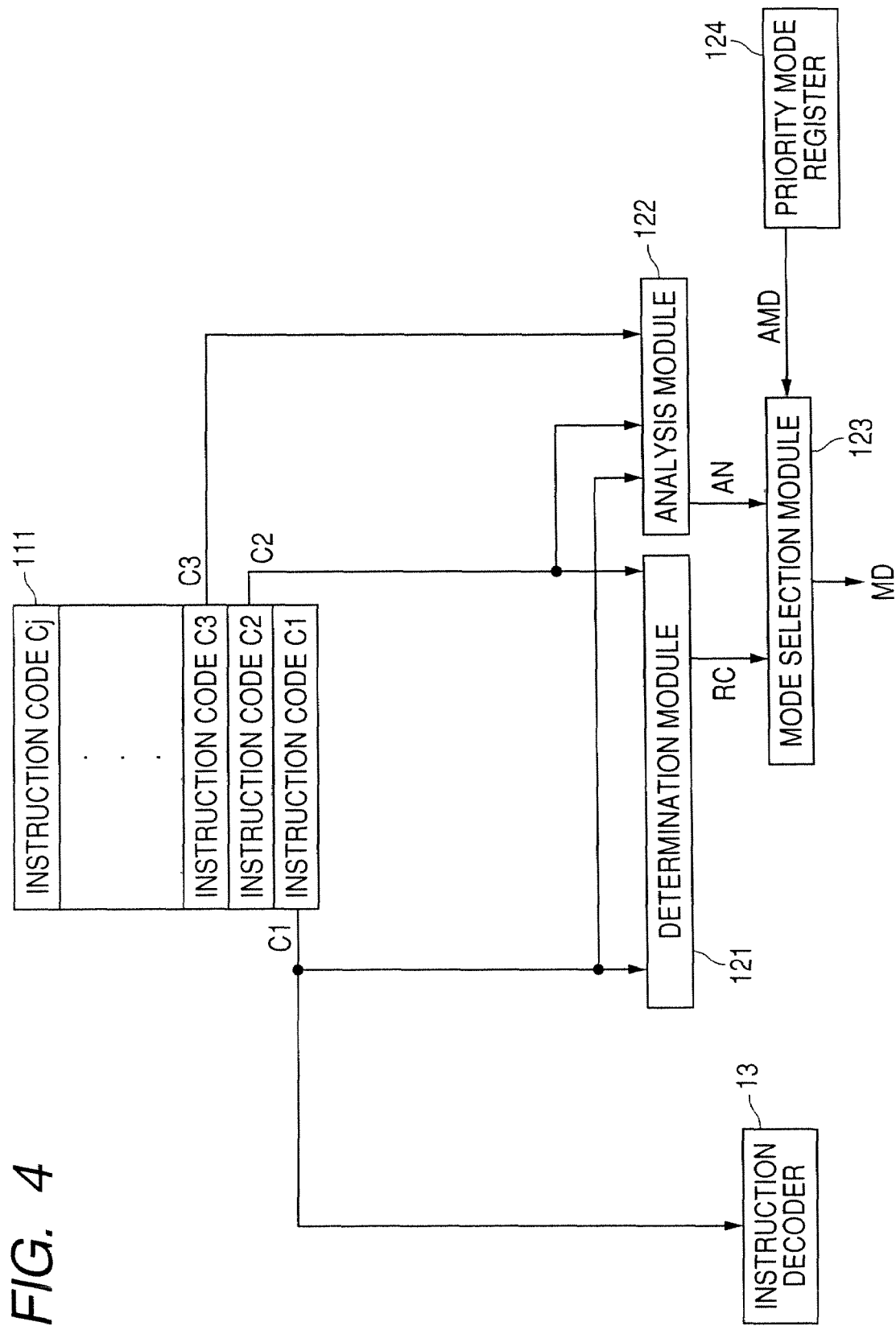
FIG. 4 is a schematic drawing to describe the operation of a mode setting unit according to the embodiment.

The operation of the mode setting unit 12 will be described in detail with reference to FIG. 4. In the description to follow, an example wherein two instructions following the read instruction are subsequent instructions is used. As shown in FIG. 4, the instruction buffer 111 in the instruction fetch unit 11 stores instruction codes C1 to Cj in the execution order (j: natural number). Thus, the instruction codes stored in the instruction buffer 111 are decoded by the instruction decoder 13 in the order of instruction code C1, instruction code C2, . . . , instruction code Cj. The instruction codes C1, C2, and C3 stored in the instruction buffer 111 are transferred to the mode setting unit 12.

The determination module 121 determines whether or not the instruction code C1 is a read instruction. When the instruction code C1 is not a read instruction, an analysis as to whether or not the subsequent instructions depend on the read instruction is skipped. The determination module 121 determines whether or not the instruction code C2 is a read instruction. When both the instruction codes C1 and C2 are read instructions, the determination module 121 transfers a signal RC to the mode selection module 123.

When the instruction code C1 is a read instruction, the instruction codes C1, C2, and C3 are transferred to the analysis module 122. The analysis module 122 decodes the instruction codes C1, C2, and C3 and analyzes whether or not each of the instruction codes C2 and C3 of the subsequent instructions depends on the instruction code C1 of the read instruction.

FIG. 5 shows an example wherein a subsequent instruction depends on the read instruction. The instruction code C1 shown in FIG. 5 is an instruction of reading data at address $1. The instruction code C2 is an add instruction using the data read by the instruction code C1. This means that the instruction code C2 depends on the instruction code C1. That is, when a destination register that stores the execution result of the read instruction is a source register that stores the data used by a subsequent instruction, the subsequent instruction depends on the read instruction.

FIG. 6 shows an example wherein a subsequent instruction does not depend on the read instruction. The instruction code C1 shown in FIG. 6 is an instruction of reading data at address $1. The instruction code C2 is an add instruction not using the data read by the instruction code C1. The instruction code C3 is a divide instruction not using the data read by the instruction code C1. This means that the instruction codes C2 and C3 do not depend on the instruction code C1.

The analysis module 122 transfers an analysis result to the mode selection module 123 as a signal AN. The mode selection module 123 selects one access mode based on the analysis result of the analysis module 122. Specifically, when the subsequent instruction depends on the read instruction, the mode selection module 123 selects the high-speed access mode that gives a higher priority to a smaller number of clock cycles required for the data reading from the cache memory. When the subsequent instruction does not depend on the read instruction, the mode selection module 123 selects the low-power access mode that gives a higher priority to smaller power consumption taken for the data reading from the cache memory. The high-speed access mode and the low-power access mode are described later in detail. The mode selection module 123 sends a mode signal MD indicating the selected access mode to the data cache system 20. The timing when the signal indicating the selected access mode is sent is the same as the timing when the memory access module 142 accesses the data cache system 20 in response to the read instruction.

The priority mode register 124 stores a specification signal AMD specifying the access mode. When a signal RC is transferred from the determination module 121, etc., the mode selection module 123 selects the access mode specified by the specification signal AMD. An example wherein the mode selection module 123 selects the access mode specified by the specification signal AMD is described later. The mode setting unit 12 executes the above-described operation while the instruction decoder 13 and the instruction execution unit 14 are executing the operation responsive to the read instruction.

Figure 7:
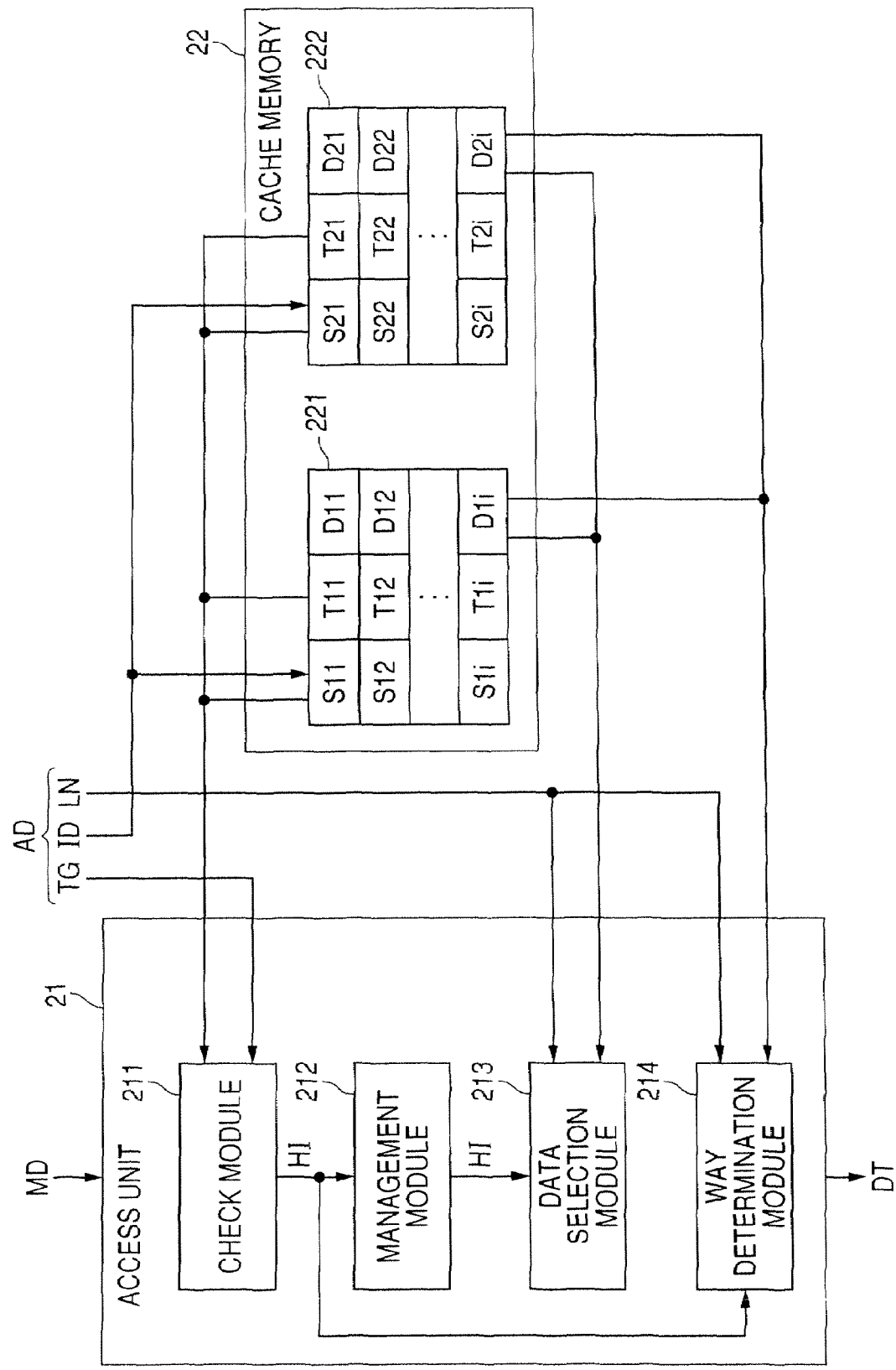
FIG. 7 is a schematic drawing to describe the operation of a data cache system according to the embodiment.

The operation of the data cache system 20 at the time of data read will be described in detail with reference to FIGS. 7 to 9. As shown in FIG. 7, the way 221 stores each data line DL1$i$ containing status information S1$i$, tag information T1$i$, and data D1$i$, and the way 222 stores each data line DL2$i$ containing status information S2$i$, tag information T2$i$, and data D2$i$. The functions of the data cache system 20 concerning the operation other than data read are not shown in FIG. 7.

First, a method of reading the objective data DT from the cache memory 22 in the high-speed access mode will be described with reference to FIGS. 7 and 8. In cycle 1 shown in FIG. 8, a read instruction is transferred from the instruction execution unit 14 to the data cache system 20 with a request signal RE, and the data stored in the cache memory 22 is transferred to the access unit 21. When a mode signal MD indicating the high-speed access mode is sent to the data cache system 20, the data line at the address corresponding to the index part ID contained in an address signal AD is read from the ways 221 and 222. The status information stored in the status register and the address information containing the tag information stored in the tag memory are transferred to the check module 211. The data stored in the data memory is transferred to the data selection module 213. The tag part TG contained in the address signal AD is transferred from the instruction execution unit 14 to the check module 211.

In cycle 2 shown in FIG. 8, the check module 211 compares each of the address information transferred from the ways 221 and 222 with the information in the tag part TG transferred from the instruction execution unit 14 and checks whether or not cache hit occurs in either of the ways 221 and 222. The check module 211 transfers information as to which of the ways 221 and 222 cache hit occurs in (which will be hereinafter referred to as "hit way information") to the management module 212 with a hit signal HI. The management module 212 sends the hit way information to the data selection module 213. Further, in cycle 2 shown in FIG. 8, the data selection module 213 selects the objective data DT from the data transferred from the ways 221 and 222 based on the hit way information. This means that the data transferred from the cache hit way is selected as the objective data DT. The line part LN contained in the address signal AD is transferred to the data selection module 213. When each data memory of the ways 221 and 222 stores two or more data, the data selection module 213 references the line part LN and selects the objective data DT. The data selection module 213 transfers the selected objective data DT to the instruction execution unit 14. When cache hit occurs in neither the way 221 nor the way 222, the data cache system 20 reads the objective data DT from the main memory 2. The data cache system 20 stores the objective data DT in the cache memory 22 and transfers the objective data DT to the instruction execution unit 14. The operation of the data cache system 20 such as the operation performed for storing the objective data DT in the cache memory 22, selection of a write way, the operation performed when different data is stored in the storage address of the cache memory 22, or update of cache management information is the same as the operation of a general data cache system.

Next, a method of reading the objective data DT from the cache memory 22 in the low-power access mode will be described with reference to FIGS. 7 and 9. In cycle 1 shown in FIG. 9, a read instruction is transferred from the instruction execution unit 14 to the data cache system 20 with a request signal RE, and the data stored in the cache memory 22 is transferred to the access unit 21. When a mode signal MD indicating the low-power access mode is sent, the status information and the tag information in the data line at the address corresponding to the index part ID contained in an address signal AD are read from the ways 221 and 222. The read status information and the address information containing the read tag information are transferred to the check module 211. The tag part TG contained in the address signal AD is transferred from the instruction execution unit 14 to the check module 211.

In cycle 2 shown in FIG. 9, the check module 211 compares each of the address information transferred from the ways 221 and 222 with the information in the tag part TG transferred from the instruction execution unit 14 and checks whether or not cache hit occurs in either of the ways 221 and 222. The check module 211 transfers hit way information to the way determination module 214 with a hit signal HI.

Further, in cycle 2 shown in FIG. 9, the way determination module 214 determines the cache hit way based on the hit way information. Then, the way determination module 214 accesses the data memory of the determined way.

In cycle 3 shown in FIG. 9, the way determination module 214 reads the objective data DT from the data line at the address corresponding to the address signal AD of the determined way. The line part LN contained in the address signal AD is transferred to the way determination module 214. When each data memory of the ways 221 and 222 stores two or more data, the way determination module 214 references the line part LN and reads the objective data DT.

The way determination module 214 transfers the read objective data DT to the instruction execution unit 14. When cache hit occurs in neither the way 221 nor the way 222, the objective data DT is transferred from the main memory 2 to the instruction execution unit 14.

As described above, in the high-speed access mode, the data stored in the data memory of the ways 221 and 222 are read and then the objective data is selected. In the low-power access mode, the way that stores the objective data is determined and then the data is read from the determined way. This means that the data stored in the data memory of the way not storing the objective data is not read in the low-power access mode. However, the low-power access mode needs a larger number of clock cycles required for reading the objective data from the cache memory 22 than the high-speed access mode does. That is, the high-speed access mode is more advantageous than the low-power access mode from the viewpoint of the data processing speed. The low-power access mode is more advantageous than the high-speed access mode from the viewpoint of the power consumption of the data processing system 1. In the data processing system 1, either of the high-speed access mode and the low-power access mode is selected based on the analysis result of the instruction to be executed after a read instruction.

As previously described, the priority mode register 124 shown in FIG. 4 transfers a specification signal AMD specifying one access mode to the mode selection module 123. For example, when read instructions are successively stored in the instruction buffer 111 or when a subsequent instruction to a read instruction is not stored in the instruction buffer 111, the mode selection module 123 references the specification signal AMD and selects one access mode. A specific example will be described below.

When read instructions are successively stored in the instruction buffer 111, when a higher priority is given to the data processing speed of the data cache system 20, the high-speed access mode is specified in the specification signal AMD. That is, when a signal RC is transferred from the determination module 121, the mode selection module 123 selects the high-speed access mode regardless of whether or not the subsequent instruction depends on the read instruction.

When first and second read instructions are successively stored in the instruction buffer 111, when a higher priority is given to data processing with smaller power consumption of the data cache system 20, the analysis module 122 analyzes whether or not a subsequent instruction depends on the first read instruction to be firstly executed among the successive first and second read instructions. When the subsequent instruction depends on the first read instruction, the mode selection module 123 selects the high-speed access mode.

When the subsequent instruction does not depend on the first read instruction, the mode selection module 123 selects the low-power access mode. When the low-power access mode is selected at the execution time of the first read instruction, the mode selection module 123 selects the low-power access mode at the execution time of the second read instruction regardless of whether or not a subsequent instruction depends on the second read instruction to be later executed among the successive read instructions, because execution of the first read instruction and execution of the second read instruction overlap if the high-speed access mode is selected at the execution time of the second read instruction. Thus, when the low-power access mode is selected at the execution time of the first read instruction, the low-power access mode is specified in the specification signal AMD.

When a subsequent instruction to a read instruction is not stored in the instruction buffer 111, whether or not the subsequent instruction depends on the read instruction is not analyzed. Thus, the mode selection module 123 references the specification signal AMD and selects the access mode. Specifically, when a higher priority is given to the data processing speed of the data cache system 20, the mode selection module 123 selects the high-speed access mode regardless of whether or not the subsequent instruction depends on the read instruction. When a higher priority is given to data processing with smaller power consumption of the data cache system 20, the mode selection module 123 selects the low-power access mode.

The processor core 10 sets the specification signal AMD stored in the priority mode register 124. That is, to successively execute read instructions, etc., the processor core 10 specifies whether the data cache system 20 operates with a higher priority given to the data processing speed or power consumption.

As described above, in the data processing system 1 according to the embodiment of the invention, the access mode to the cache memory 22 is selected based on the analysis result of the subsequent instruction scheduled to be executed after execution of the read instruction. That is, in the data processing system 1, when the subsequent instruction uses the execution result of the read instruction, the high-speed access mode giving a higher priority to data acquisition at high speed is selected. When the subsequent instruction does not use the execution result of the read instruction, the low-power access mode giving a higher priority to smaller power consumption is selected. Consequently, it may be possible to prevent an increase in the data processing time and a decrease in the power consumption of the data processing system.

According to the embodiment of the invention, the data processing system may make it possible to select an access mode to the cache memory at the execution time of a read instruction based on the type of instruction to be executed after the read instruction.

Other Embodiments

Although specific embodiment of the invention has been described above, it is to be understood that the description and the drawings forming parts of the disclosure do not limit the invention. From the disclosure, various alternative embodiments, examples, and operational arts will be apparent to those skilled in the art.

In the above-description, the cache 22 has the two ways 221 and 222. However, when the cache 22 has three or more ways, the access mode to the cache 22 is determined in a similar manner to that described above.

The invention includes various embodiments, etc., not described herein, of course. Therefore, the technical scope of the invention is to be determined solely by the inventive concepts which are delineated by the description given above.

What is claimed is:

1. A data processing system comprising:
   a cache memory comprising a plurality of ways, each of which stores a data line including a data and address information of the data;
   an analysis module that analyzes whether or not a data requested in a read instruction is to be used in a subsequent instruction to be executed within a predetermined time period after the execution of the read instruction is started;
   a mode selection module that selects one of a plurality of access modes for accessing the cache memory based on a result of the analysis module; and
   an access unit that accesses the cache memory in the selected one of the access modes when the read instruction is executed,
   wherein the plurality of access modes comprise:
      a high-speed access mode that gives a higher priority to the small number of clock cycles required for reading data from the cache memory; and
      a low-power access mode that gives a higher priority to a small power consumption taken for reading data from the cache memory;
   wherein the selection module selects the high-speed access mode when the data read by the read instruction is to be used in the subsequent instruction, and
   wherein the selection module selects the low-power access mode when the data read by the read instruction is not to be used in the subsequent instruction.

2. The system of claim 1,
   wherein the access unit comprises:
      a check module that compares each of the address information included in the data lines read from the plurality of ways with address information included in the read instruction to determine which of the ways the data requested in the read instruction is stored in when the high-speed access mode is selected; and
      a data selection module that selects the data requested in the read instruction from the data lines read form the plurality of ways based on a result of the check module.

3. The system of claim 1,
   wherein the access unit comprises:
      a check module that compares each of the address information read from the plurality of ways with address information included in the read instruction to determine which of the ways the data requested in the read instruction is stored in when the low-power access mode is selected; and
      a way determination module that determines one of the ways that stores the data requested in the read instruction based on a result of the check module.

4. The system of claim 3, wherein the way determination module reads the data requested in the read instruction from the way determined by the way determination module.

5. The system of claim 1, further comprising an instruction buffer that stores the read instruction and the subsequent instruction in an execution order.

6. The system of claim 5, further comprising a determination module that determines whether or not the subsequent instruction is a read instruction.

7. The system of claim 5, further comprising a priority mode register that stores a selection signal indicating one of the plurality of access modes.

8. The system of claim 7, wherein the mode selection module selects the one of the access modes indicated by the selection signal when read instructions are successively stored in the instruction buffer.

9. The system of claim 7, wherein the mode selection module selects the one of the access modes indicated by the selection signal when the instruction buffer does not store any subsequent instruction.

10. The system of claim 1, wherein the analysis module decodes the subsequent instruction and determines whether or not the subsequent instruction uses a result of the read instruction.

11. The system of claim 1, further comprising an instruction execution unit that executes the read instruction.

12. A method for processing data implemented by a data processing system, the method comprising:
   analyzing whether or not a data requested in a read instruction is to be used in a subsequent instruction to be executed within a predetermined time period after the execution of the read instruction is started;
   selecting one of a plurality of access modes for accessing a cache memory based on a result of the analyzing, the cache memory comprising a plurality of ways, each of which stores a data line including a data and address information of the data; and accessing the cache memory in the selected access mode when the read instruction is executed, wherein the plurality of access modes comprise:

a high-speed access mode that gives a higher priority to the small number of clock cycles required for reading data from the cache memory; and a low-power access mode that gives a higher priority to a small power consumption taken for reading data from the cache memory;

wherein the selecting comprising:

selecting the high-speed access mode when the data read by the read instruction is to be used in the subsequent instruction; and selecting the low-power access mode when the data read by the read instruction is not to be used in the subsequent instruction.

13. The method of claim 12, further comprising:

when the high-speed access mode is selected, reading the plurality of data lines stored in the plurality of ways;

comparing each of the address information included in the data lines with address information included in the read instruction;

determining which of the ways the data requested in the read instruction is stored in; and selecting the data requested in the read instruction form the data lines read from the plurality of ways based on a result of the determining step.

14. The method of claim 12, further comprising:

when the low-power access mode is selected, reading the address information from each of the plurality of the ways;

comparing each of the address information with address information included in the read instruction;

determining which of the ways the data requested in the read instruction is stored in; and reading the data requested in the read instruction from the determined way.

15. The method of claim 12, further comprising storing the read instruction and the subsequent instruction in an execution order.

16. The method of claim 15, further comprising determining whether or not the subsequent instruction is a read instruction.

17. The method of claim 16, wherein one of the plurality of access modes indicated by a priority mode register is selected when read instructions are successively stored.

18. The method of claim 12, wherein the analyzing comprising decoding the subsequent instruction to analyze whether or not the data read by the read instruction is to be used in the subsequent instruction.

* * * * *